(12) United States Patent
Wenk et al.

(10) Patent No.: US 6,253,088 B1
(45) Date of Patent: Jun. 26, 2001

(54) PERSONAL BASE STATION FOR INTEGRATED CELLULAR AND CORDLESS COMMUNICATION SYSTEM

(75) Inventors: Richard D. Wenk, San Diego, CA (US); Shuzo Kato, Yokohama (JP)

(73) Assignee: Uniden America Corporation, Ft. Worth, TX (US)

( * ) Notice: Subject to any disclaimer, the term of this patent is extended or adjusted under 35 U.S.C. 154(b) by 0 days.

(21) Appl. No.: 08/977,009

(22) Filed: Nov. 24, 1997

(51) Int. Cl.[7] .............................. H04Q 7/20; H04Q 7/26; H04Q 7/30
(52) U.S. Cl. .................... 455/462; 455/426; 455/561; 455/463; 455/417; 455/465; 455/461; 455/435; 455/433
(58) Field of Search ................................ 455/462, 426, 455/414, 465, 561, 550, 552, 403, 463, 435, 433, 461, 417; 379/106 FOR, 428, 433

(56) References Cited

U.S. PATENT DOCUMENTS

| | | | |
|---|---|---|---|
| 5,367,558 | * | 11/1994 | Gillig et al. ........................... 455/462 |
| 5,442,680 | * | 8/1995 | Schellinger et al. ................. 455/462 |
| 5,509,052 | * | 4/1996 | Chia et al. ............................ 455/462 |
| 5,515,420 | * | 5/1996 | Urasaka et al. ...................... 455/462 |
| 5,745,850 | * | 4/1998 | Aldermeshian et al. ............ 455/403 |
| 5,774,805 | * | 6/1998 | Zicker .................................. 455/462 |
| 5,915,224 | * | 6/1999 | Jonsson ................................ 455/552 |
| 5,926,760 | * | 7/1999 | Khan et al. .......................... 455/435 |

* cited by examiner

*Primary Examiner*—William G. Trost
*Assistant Examiner*—Keith Ferguson
(74) *Attorney, Agent, or Firm*—Kevin J. Zimmer; Cooley Godward LLP

(57) ABSTRACT

An integrated cellular and cordless communication system in which cellular calls are forwarded to a landline telephone number associated with a personal base station when a subscriber terminal is determined to be within a predefined vicinity of the personal base station is described herein. Once forwarded to the personal base station via external network elements, such calls may be answered using a cordless device operative to communicate with the personal base station. Alternately, the calls may be transferred to a voice messaging module within the personal base station. When the subscriber terminal is determined to have been removed from within the vicinity of the personal base station, a message from the personal base station to the external network elements results in modification of a call forwarding address such that subsequent calls intended for the subscriber terminal are in fact routed thereto. The personal base station may also be optionally implemented to enable the forwarding of calls intended for the personal base station to the subscriber terminal. A subscriber could indicate the desire for this type of call forwarding by way of, for example, a user interface of the personal base station. In response, the personal base station would issue a request to the external network elements to forward subsequent calls intended for the landline telephone number of the personal base station to the subscriber terminal.

2 Claims, 9 Drawing Sheets

PERSONAL BASE STATION FOR INTEGRATED CELLULAR AND CORDLESS COMMUNICATION SYSTEM

BACKGROUND OF THE INVENTION

I. Field of the Invention

The present invention relates generally to the field of communication networks, and particularly to systems and methods for integrating portable cellular service with landline telephone service.

II. Description of the Related Art

A wide variety of options are available for enhancing home or office telephone systems. For example, constraints on mobility arising from the limited length of telephone cords can be overcome through the purchase a cordless telephone. This enables an increase in roaming range, which can be extended to a virtually unlimited extent through the additional purchase of a cellular telephone. However, the relatively higher cost for cellular air time creates an incentive to have a cordless telephone for home use and a cellular telephone for use outside of the home.

A cordless telephone system typically includes a portable cordless handset and a cordless base station connected to a telephone company phone system by telephone landlines. The cordless base station has an assigned landline telephone number that allows the user to place and receive calls using the cordless portable handset within a limited range of the cordless base station, such as in a home.

As mentioned above, wireless communication outside of the range of the cordless telephone system may also be provided via a cellular telephone system. A cellular telephone system typically includes portable subscriber stations and cellular base stations connected to the landline telephone system by way of one or more cellular switching networks. Each cellular subscriber unit has an assigned cellular telephone number that allows calls to be made and received throughout the area covered by base stations operated by the applicable service provider and its affiliated providers.

It has been found that difficulties tend to arise when a user frequently relocates between the nominal domains of the cordless and cellular telephone systems. For example, incoming calls routed through the cellular system may be missed when the user is at home, and incoming calls routed to the user's landline telephone number may be missed when the user is outside of the home.

Efforts to address these difficulties have been directed to the development of handsets capable of operating as standard cellular radiotelephones and also as cordless (or microcellular) telephones when within range of an associated cordless (or microcellular) base station. For example, U.S. Pat. No. 5,488,649, entitled "METHOD FOR VALIDATING A COMMUNICATION LINK", issued Jan. 30, 1996, describes a cordless communication system incorporating a portable cellular cordless ("PCC") radiotelephone. The PCC has the ability to communicate with a conventional cellular radiotelephone system, with a microcellular base station, or a cordless base station. The cordless communication system uses authorization and call routing equipment to provide call routing information to a telephone switching system disposed to automatically route calls between the cellular, microcellular, and cordless systems. In addition, U.S. Pat. No. 5,594,782, entitled "MULTIPLE MODE PERSONAL WIRELESS COMMUNICATION SYSTEM", issued Jan. 14, 1997, describes a system in which handsets automatically switch between a standard cellular telephone radiotelephone mode of operation and an enhanced cordless mode when within range of picocells located at customer-selected locations. Unfortunately, implementation of such "dual-mode" systems may often be impractical due to the relatively high cost of dual-mode handsets and the increased system complexity arising from the addition of specialized call routing equipment.

Another proposal to facilitate integration of wireless (e.g., cellular or PCS) and wireline communication networks involves utilization of a subscriber personal base station to originate a call to the wireless network when the subscriber's cellular/PCS device is within range of the of the personal base station. Such a technique is described in, for example, PCT Application Number PCT/US96/19879, which was published Jul. 3, 1997 under International Publication Number WO 97/24004, the disclosure of which is herein incorporated by this reference. Such proposals contemplate that the call originated by the personal base station results in the wireless network being instructed to route all cellular/PCS calls to the subscriber's landline phone number when the cellular/PCS device is detected as being within range of the personal base station. Specifically, the call originated by the personal base station is directed to a new network element at a mobile switching center that answers the call, collects the necessary information, emulates a visitors location register ("VLR") and originates a registration notification to a subscribers home location register ("HLR"). When registered, the call will result in the HLR querying the new network element or special VLR for re-routing information on all subsequent calls made to the subscriber's cellular number. The special VLR will respond to the HLR by re-routing such subsequent calls to the subscriber's landline telephone number.

One disadvantage of the foregoing proposal is the requirement that a user generally possess at least a personal base station, a landline telephone and a cellular telephone. If the user does not desire to, for example, continue to posses a landline telephone upon acquiring a personal base station, then when the user leaves the location which would otherwise be served by the landline telephone (e.g., the user's home) such location is left without telephone service. Accordingly, the user is required to purchase all three of the devices listed above or accept the consequences of having only intermittent phone service available at home or office locations. Moreover, the personal base stations currently being considered for development in connection with the foregoing proposal generally utilize a wireless communication link to obtain identification information concerning the subscriber's cellular/PCS device when such device is determined to be within radio range of the personal base station. This results in an appreciable increase in cost, since the personal base station is required to incorporate a dedicated radio transceiver simply for detecting and/or obtaining information from the subscriber's cellular/PCS device.

Thus there exists a need for a system capable of further improving integrated wireless and landline telephone service in a cost effective manner, and which preferably eliminates the need for acquisition of a separate landline telephone, personal base station, and cellular/PCS telephone.

SUMMARY OF THE INVENTION

The present invention is directed to an integrated cellular and cordless communication system in which cellular calls are forwarded to a landline telephone number associated with a personal base station when a subscriber terminal is determined to be within a predefined vicinity of the personal base station. Once forwarded to the personal base station by way of call routing equipment in the external network, such calls may be answered using a cordless device operative to communicate with the personal base station. Alternately, the calls may be transferred to a voice messaging module within the personal base station. When the subscriber terminal is determined to have been removed from within the vicinity of the personal base station, a message from the personal base station to the external network results in the call forwarding address being modified such that subsequent calls intended for the subscriber terminal are in fact routed thereto. The personal base station may also be optionally implemented to enable the forwarding of calls intended for the personal base station to the subscriber terminal. A user could indicate the desire to initiate this type of call forwarding by way of, for example, a user interface of the personal base station. In response, the personal base station would inform the external network of the desire to initiate call forwarding, which would result in the forwarding to the subscriber terminal of subsequent landline calls intended for the personal base station.

BRIEF DESCRIPTION OF THE DRAWINGS

For a better understanding of the features, objects, and advantages of the present invention, reference should be made to the following detailed description taken in conjunction with the following drawings, in which.

DETAILED DESCRIPTION OF THE PREFERRED EMBODIMENTS

Figure 1:
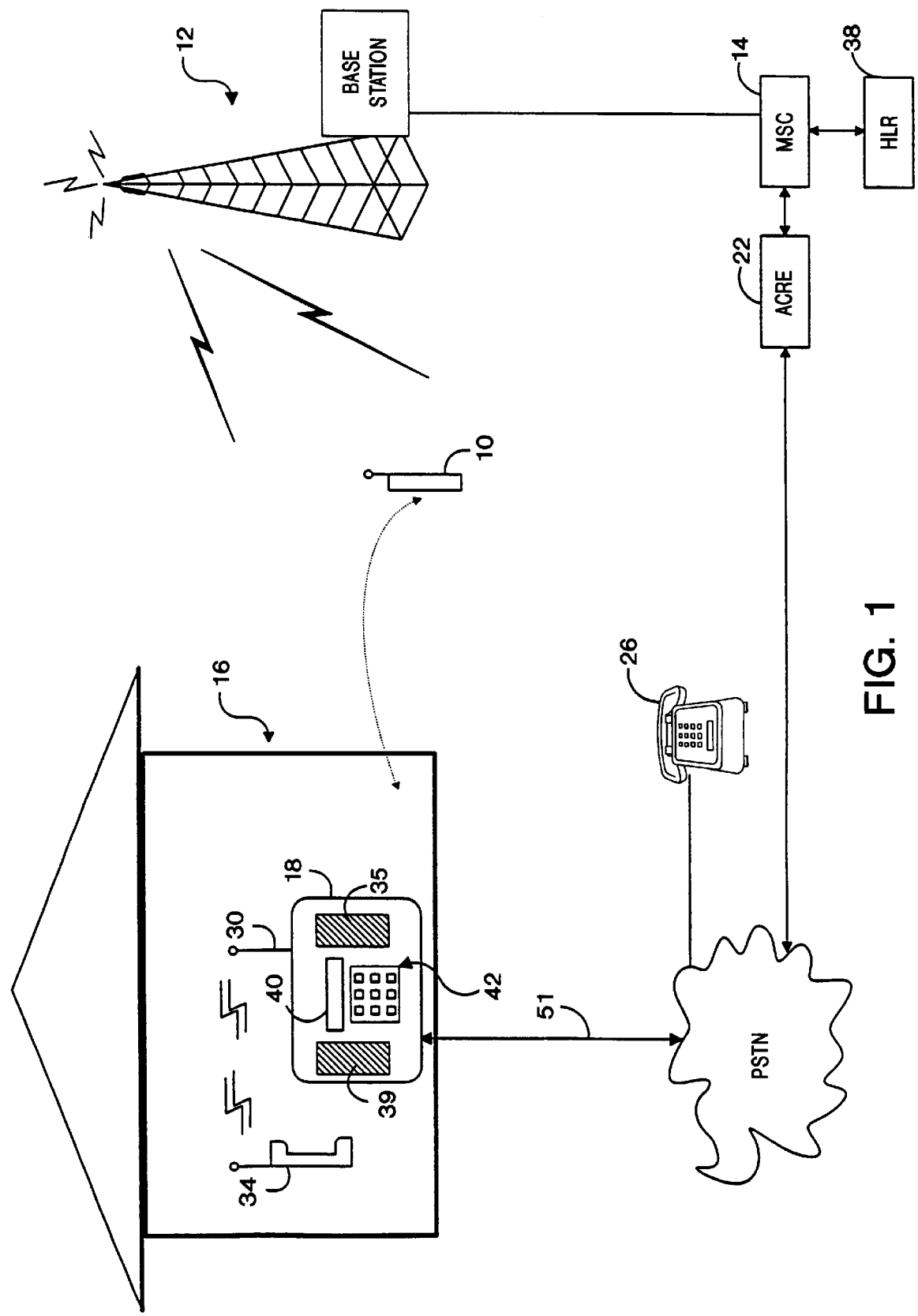
FIG. 1 shows an integrated cellular and cordless communication system incorporating the personal base station of the present invention.

Referring to FIG. 1, a conventional (except as otherwise described herein) cellular radiotelephone 10, or "subscriber terminal 10", is served by a mobile cellular network having a base station 12 and a mobile switching center ("MSC") 14. The subscriber terminal 10 is operated by a subscriber having, for example, a home location 16 including a personal base station 18 configured in accordance with the present invention. The personal base station 18 is coupled through the public switched telephone network ("PSTN") to authorization and call routing equipment ("ACRE") 22 linked to the MSC 14 of the mobile cellular network. The PSTN includes end offices (not shown) capable of providing the personal base station 18 and another telephone 26 with wireline plain old telephone service (POTS). As is described below, the personal base station 18 includes a wireless interface (FIG. 2) and an associated antenna 30 for collectively facilitating communication with a cordless station 34. When cordless station 34 is not in use, it may be placed in docking bay 39 of the personal base station 18. As is described hereinafter, the personal base station 18 is disposed to cooperate with network elements in the PSTN and the mobile cellular networks to enable the selective forwarding of calls intended for the subscriber terminal 10 to the cordless station 34, and vice-versa.

In order for the cordless station 34 to communicate with the personal base station 18 it must generally be authorized to use a particular channel. Authorization is required since the licensee is of the applicable spectrum is required by the FCC to maintain control of its transmitters. The personal base station 18 may be programmed in a conventional manner to update its authorization periodically. To do this the personal base station 18 initiates a standard telephone call to the ACRE 22. The ACRE 22 responds with a connect message containing a first random number that will be used in the authentication process. The personal base station 18 responds with an authentication message containing a cordless base station ID, a first authentication result calculated using the first random number, and a second random number. The ACRE 22 responds with an authorization and authentication message, which contains a second authentication result calculated using the second random number, and information describing over which channels the personal base station 18 can communicate with the cordless station 34. A detailed description of the authentication process effectuated through the ACRE 22 is set forth in U.S. Pat. No. 5,488,469, entitled "METHOD FOR VALIDATING A COMMUNICATION LINK", issued Jan. 30, 1996, the disclosure of which is herein incorporated by this reference.

When the subscriber terminal 10 is detected to be within a predefined range or the personal base station 18, or placed in direct contact with the docking bay 35, the personal base station 18 provides a registration message to the ACRE 22. The registration message includes the mobile identification number ("MIN") of the subscriber terminal 10, and requests the ACRE 22 to configure the mobile wireless network to route all cellular calls intended for the subscriber terminal 10 to the landline phone number associated with the personal base station 18. The ACRE 22 then effectively emulates a visitors location register ("VLR"), and originates a registration notification to a home location register ("HLR") 38 of the personal base station 18. When calls are subsequently made to the cellular number of the subscriber terminal 10, the HLR 38 will query the ACRE 22 for call re-routing information. In a preferred implementation of the present invention, this re-routing information will specify that calls intended for the subscriber terminal 10 be routed to the telephone number assigned to the personal base station 18. The ACRE 22 will respond to the HLR 38 by providing re-routing information such that subsequent calls to the subscriber terminal 10 are re-routed to the telephone number of the personal base station 18. These re-routed calls may be answered upon removal of the cordless station 34 from the docking bay 39 or transferred to a voice messaging module (not shown) within the personal base station 18.

The personal base station 18 also provides a message (via a telephone call) to the ACRE 22 to de-activate the call forwarding described above when the subscriber terminal 10 is moved outside of the predefined vicinity of, or out of direct contact with, the personal base station 18. Also included in the personal base station 18 is a visual display 40 to indicate that call-forwarding is, or is not, re-directing calls from the subscriber terminal 10 to the personal base station 18, or vice-versa (described below).

The personal base station 18 may optionally be implemented to originate a standard telephone call to the external wireless network when it is desired to forward calls intended for the personal base station 18 to the subscriber terminal 10. In a preferred implementation a subscriber would indicate this intention to the personal base station 18 via a user interface 42, at which point the personal base station 18 would inform the external wireless network (via the PSTN) of the desire to initiate call forwarding. Alternately, the external wireless network would only be requested to initiate such call forwarding when the subscriber terminal was not detected to be within a predefined vicinity of the personal base station 18, or docked within docking bay 35. The call originated by the personal base station 18 would request that the external wireless network ensure that all landline calls intended for the personal base station 18 are routed to the subscriber terminal 10 via the external wireless network.

The personal base station 18 may include either a conventional infra-red proximity detection device 33 (FIG. 2), or a device responsive to physical contact with the docking bay 35, to detect that the subscriber terminal 10 is within a predefined vicinity of, or docked in, the personal base station 18. Information concerning the subscriber terminal 10 (e.g., mobile identification number "MIN"), may be directly transferred to the personal base station 18 from the subscriber terminal when the subscriber terminal 10 is placed within docking bay 35. In this implementation the pertinent identification information may be transferred through a dedicated port in the subscriber terminal 10 which becomes coupled to a reciprocal port (not shown) in the docking bay 35 upon insertion of the subscriber terminal 10 in the docking bay 35. Alternately, the identification information pertinent to the subscriber terminal 10 could initially be entered into and stored within the personal station 18 via the user interface 42. The personal base station 18 could be configured or programmed such that one or more keys, buttons or icons of user interface 42 would become representative of a particular subscriber terminal 10. Upon placing the subscriber terminal 10 into the docking bay 35, the associated user would depress such one or more keys, buttons or icons and the associated identification information applicable to subscriber terminal 10 would be retrieved from within personal base station 18 and forwarded to ACRE 22 in the subsequent registration call.

Figure 2:
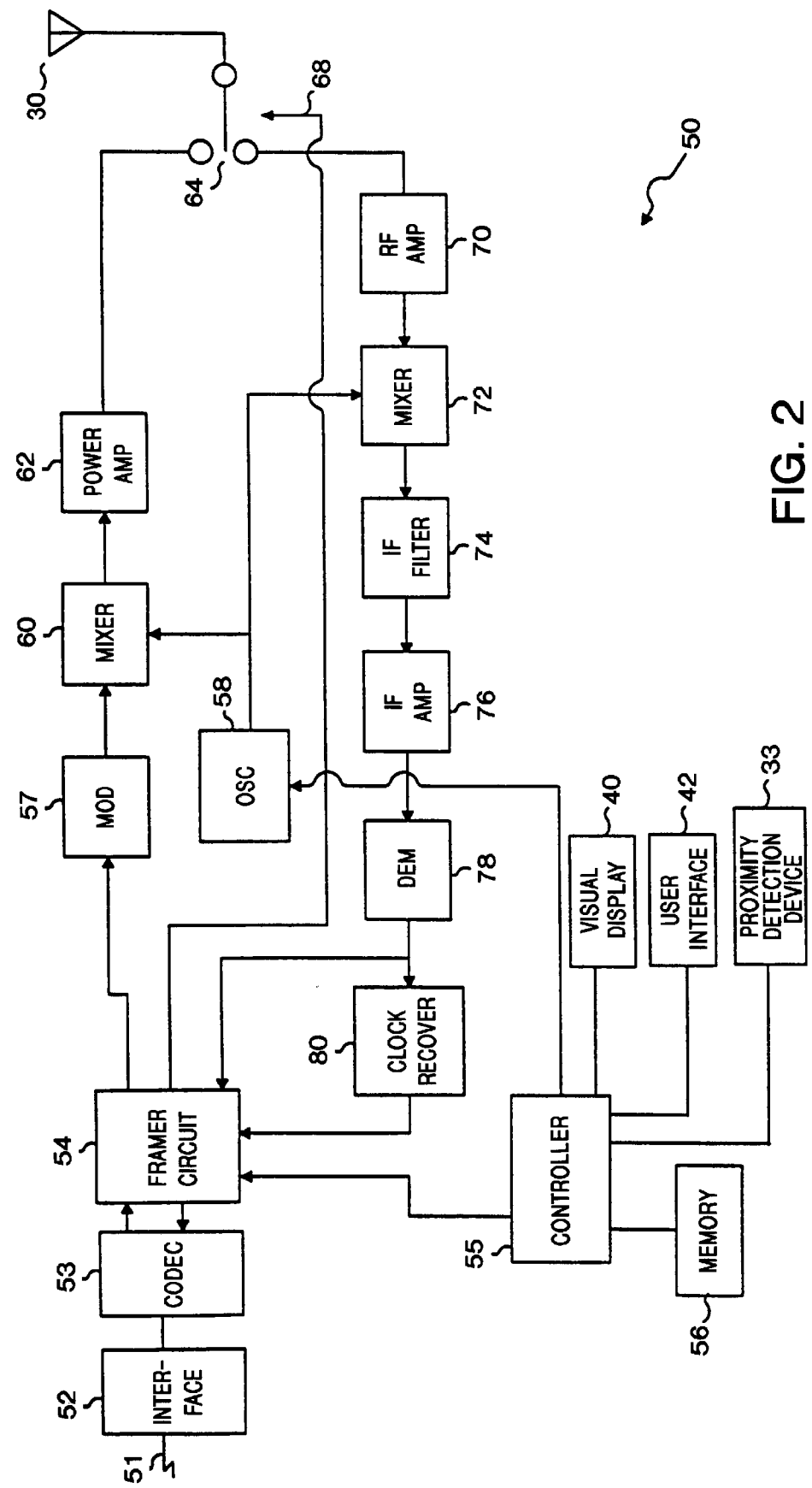
FIG. 2 is a block diagram of the personal base station, and depicts with particularity the elements included within a transceiver module therein.

FIG. 2 is a block diagram of the personal base station 18, which depicts with particularity the elements included within a transceiver module 50. The transceiver module 50 is substantially similar to a corresponding transceiver within the cordless station 34, and particular realizations of both are described in U.S. Pat. No. 5,434,905, entitled "DIGITAL CORDLESS TELEPHONE SET OPERATED UNDER BURST SYNCHRONIZATION", issued Jul. 18, 1995, assigned to Uniden Corporation, the disclosure of which is herein incorporated by this reference. In FIG. 2, the analog voice signal from a telephone network line 51 provided through an interface 52 is changed to a digital voice signal by the voice CODEC 53. Certain preamble data, status data and check bits are then added serially to the digital voice signal by a framer circuit 54, which may be implemented using a multiplexor/demultiplexor. The framer circuit 54, under the direction of a controller 55, also adds a "unique word" to the digital voice signal including both frequency channel information bits and fixed pattern bits (both described below).

The frequency channel information bits of the unique word provided to the framer circuit 54 are indicative of the frequency used to communicate between the cordless station 34 and the personal base station 18, and the pattern of these bits is different for each frequency channel. On the other hand, the pattern of the fixed pattern bits is the same for all frequency channels. The frequency channel information bits in each frequency channel are determined by the frequency channel information stored for each channel in memory 56.

When the personal base station 18 initiates communication with the cordless station 34, the controller 55 reads, from the memory 56, the frequency channel information corresponding to the frequency channel to be used in such communication. The controller 55 then sends such information to the framer circuit 54. The framer circuit 54 sets the value of the unique word based on the frequency channel information sent from the controller 16, and outputs baseband transmission data to a modulator 57.

Since communication between the personal base station 18 and the cordless station 34 is nominally time division duplex ("TDD"), the baseband transmission data generated by the framer circuit 54 occupies one-half of the TDD burst frame cycle with the other-half of the burst frame cycle being used for reception. The baseband transmission data is modulated by the modulator 57, heterodyned up to the RF frequency with the local oscillator signal from the local oscillator 58 by a mixer 60, and then amplified by a radio frequency (RF) power amplifier 62. Finally, the RF signal goes through the antenna switch 64 and is transmitted from the antenna 30. The antenna switch 64 is interchangeably switched between transmitting and receiving modes in response to a TX/RX control signal 68, which is generated by the framer circuit 54 based upon frame synchronization.

During the receive half cycle of each TDD burst frame, the signal received by the antenna 30 goes through the antenna switch 64 and is amplified by the front-end amplifier 70. The amplified received signal is then mixed with a local oscillator signal from the local oscillator 58 in a mixer 72 to produce an intermediate frequency (IF) signal. The IF signal is filtered by an IF filter 74 and amplified by an IF amplifier 76. The amplified IF signal is provided to a demodulator 78 which demodulates the IF signal so as to recover the baseband receive data. The recovered baseband data is then provided by the demodulator 78 to the framer circuit 54 and to the clock recovery circuit 80.

The framer circuit 54 detects the unique word from the baseband receive data, and compares the frequency information included therein to the frequency actually being received. If the framer circuit 54 determines that the correct frequency has been received, then the clock recovery circuit 80 is utilized to establish frame synchronization. In an exemplary implementation the clock recovery circuit 80 is disposed to recognize a predefined bit pattern in the preamble of the baseband receive data, and to provide a synchronized bit clock to the framer circuit 54 upon making such recognition. Once frame synchronization is established, the recovered digital voice signal is processed by the framer circuit 54 in accordance with the recovered clock signal provided by the clock recovery circuit 80. The recovered digital voice signal produced by the framer circuit 54 is provided to the CODEC 53, which converts the recovered digital voice signal into an analog voice signal for transmission on the telephone network line 51 via the interface 52.

Figure 3:
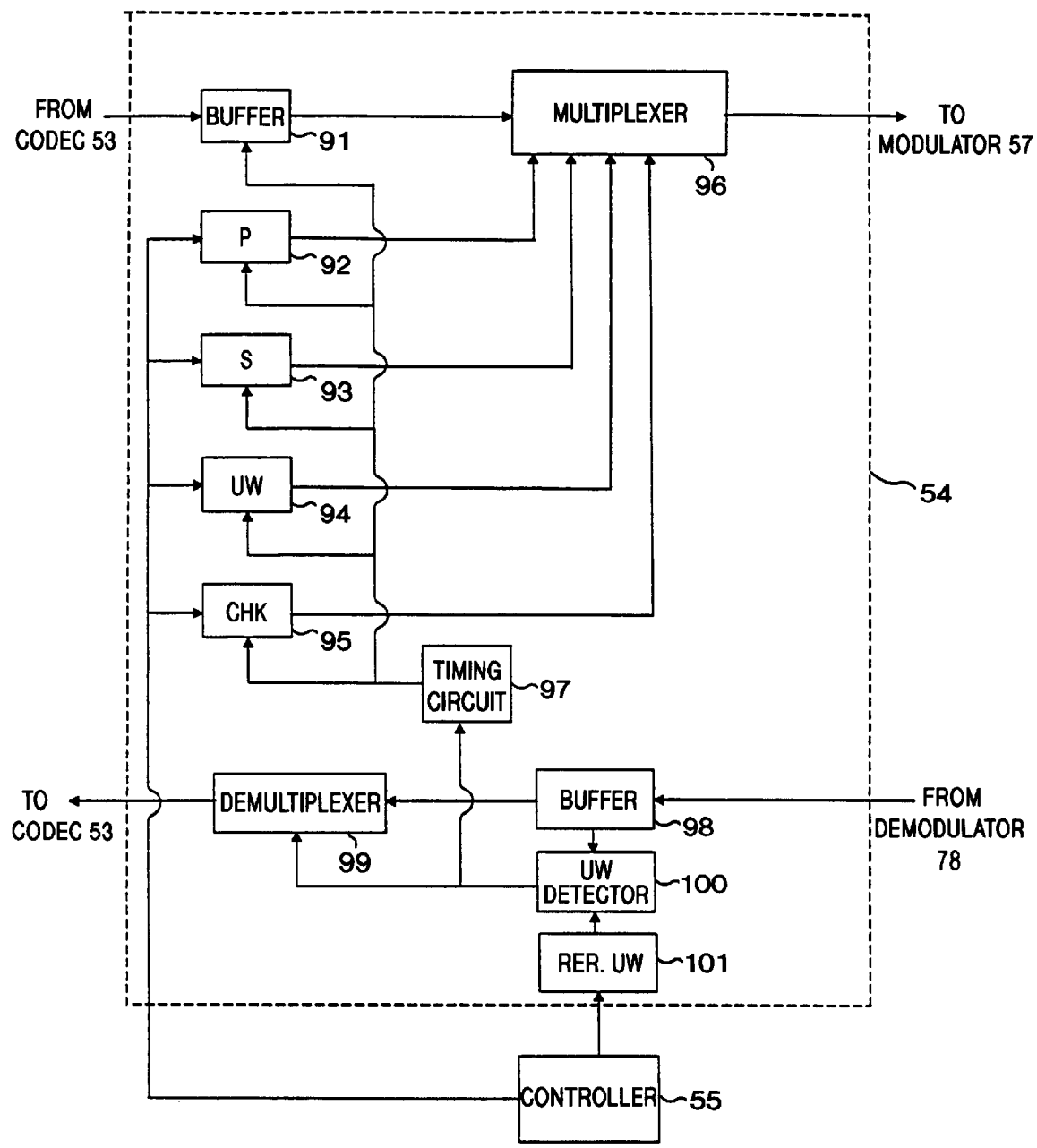
FIG. 3 provides a detailed representation of a framer circuit included within the personal base station of the present invention.

FIG. 3 provides a more detailed representation of the framer circuit 54 of the personal base station 18, it being understood that the framer circuit 54' of the cordless station 34 is substantially identical in structure and operation. The transmitting section of the framer circuit 54 includes a buffer 91, a preamble bit generator 92, a status bit generator 93, a unique word generator 94, a check bit generator 95, a multiplexor 96 and a timing circuit 97. The receiving section of the framer circuit 54 comprises a buffer 98, a demultiplexor 99 and a unique word detector 100.

While the frame buffer 54 is in a transmission mode, voice data from the CODEC 53 is initially stored in buffer 91. The voice data from the buffer 91, the preamble bits from the preamble bit generator 92, the status bits from the status bits generator 93, the unique word from the unique word generator 94 and the check bits from the check bit generator 95 are multiplexed by a multiplexor 96 into a frame of data for transmission. During this multiplexing process the output timing of the buffer 91 and of the generators 92–95 are controlled by the timing circuit 97. The timing circuit 97 is driven by a signaling pulse from the unique word detector 100, the operation of which is described below.

During operation of the frame buffer 54 in a receive mode, the baseband data from the demodulator 78 is initially stored in buffer 98. The data stored in the buffer 98 is then provided to the demultiplexor 99 and the unique word detector 100. The unique word detector 100 detects the unique word inherent within the received baseband data and compares this detected unique word to a reference unique word stored in buffer 101. The reference unique word is stored in buffer 101 by controller and corresponds to the unique word produced by the unique word generator 94. When unique word detector 100 detects a "match" between the detected unique word and the reference unique word, the detector 100 provides a signaling pulse to the timing circuit 97 and to the demultiplexor 99. Upon receipt of the signaling pulse from the unique word detector 100, the demultiplexor 99 extracts the digital voice and control data from the received baseband data and forwards this extracted information to the CODEC 53. In addition, the demultiplexor 99 extracts status bits from the received baseband data and provides these to the controller 55.

Figure 4:
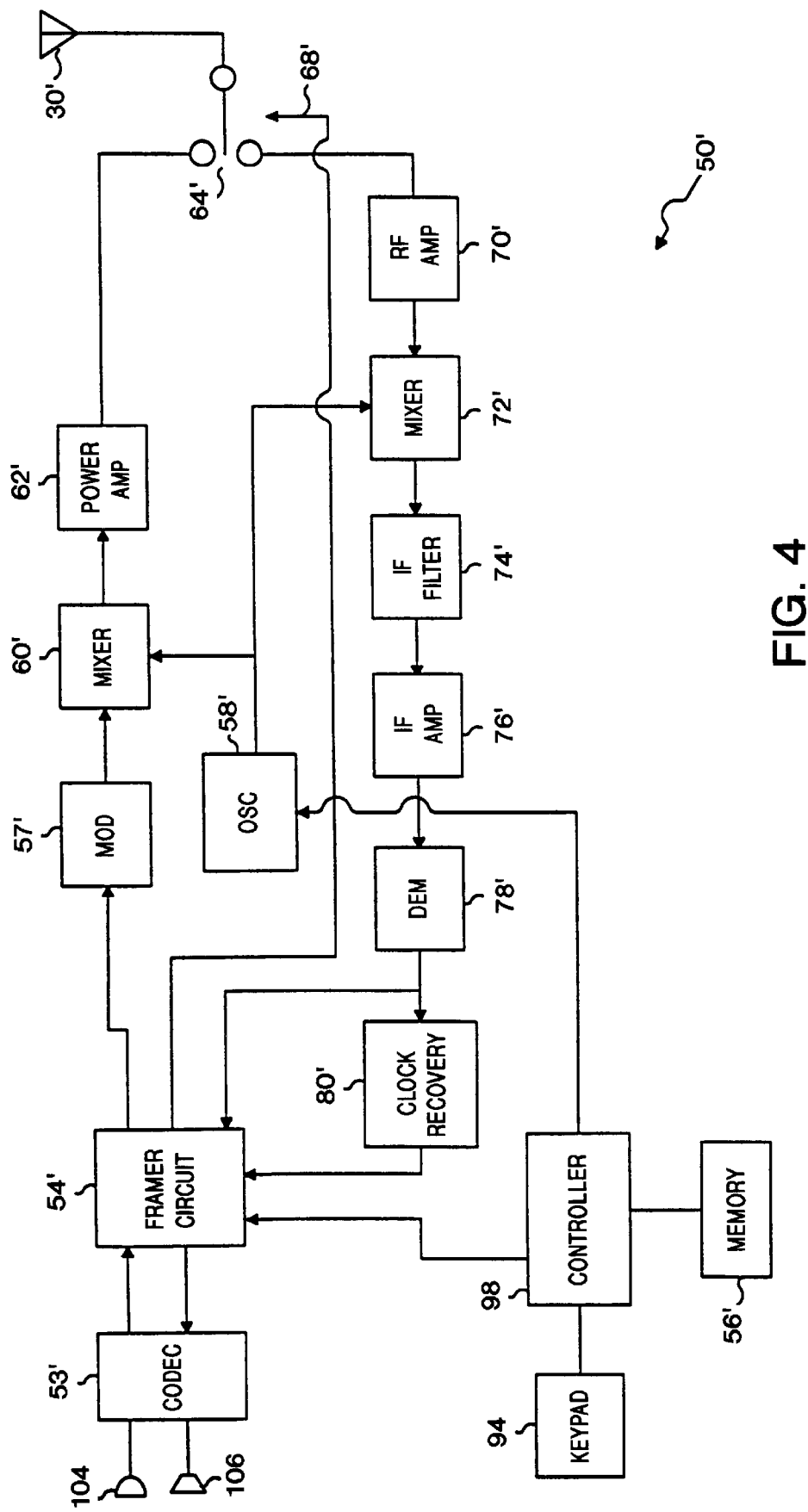
FIG. 4 is a block diagram of a cordless station disposed to communicate with the personal base station.

FIG. 4 is a block diagram of the cordless station 34, which depicts with particularity the elements included with a transceiver module 50' disposed to facilitate communication with the personal base station 18. In view of the substantial similarity between the transceiver module 50' and transceiver module 50 (FIG. 2), a detailed description of the operation of the cordless station 34 will not be provided herein and primed reference numerals will be used in FIG. 4 to identify elements substantially identical to corresponding elements in FIG. 2. Referring to FIG. 4, the cordless station 34 includes a microphone 104 and a speaker 106 in lieu of the interface 52 of FIG. 2. The microphone 104 and the speaker 106 are connected to CODEC 53' and the keypad 94 is connected to the controller 98. The transceiver 50' is operative to transmit and receive voice and data information transferred via the microphone 104 and the speaker 106 in the manner described above with reference to the interface 52.

The subscriber terminal 10 could be realized by modifying a conventional wireless handset in a number of different ways to facilitate the transfer of identification information (e.g., MIN) to the personal base station 18 when the subscriber terminal 10 is docked therein. For example, a port or pin could be incorporated within the subscriber terminal 10 to facilitate electrical and mechanical coupling with the personal base station 18. Such a port, or a pin-type structure, could also enable the subscriber terminal 10 to detect its insertion into the docking bay 35, as well as allow the personal base station 18 to detect such insertion. The subscriber terminal 10 will preferably also be configured so that, upon such detection, it would enter an "offline" state during which communication with the external wireless network would be suspended.

Figure 5:
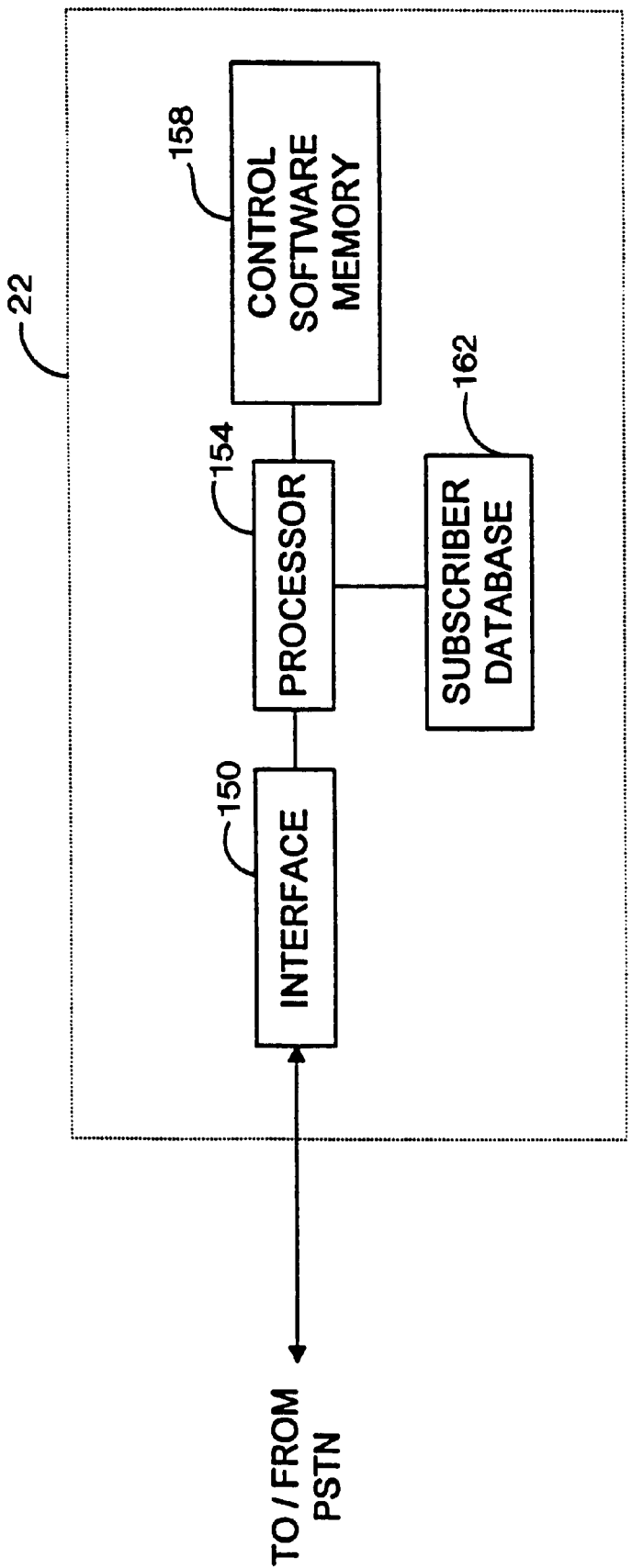
FIG. 5 provides a block diagram representation of authentication and call routing equipment ("ACRE") disposed to perform authentication and call routing operations.

Turning now to FIG. 5, a block diagram of the ACRE 22 is shown in which connection to the PSTN is made through an interface 150. The interface 150 controls and formats messages between the PSTN and a processor 154. The processor 154 in combination with a control software memory 158 comprises the intelligence of the ACRE 22 and performs authorization and authentication tasks, and provides call routing information. A subscriber database 162 contains the data required by the processor 154 to perform the tasks discussed above. The ACRE 22 can be separate from the PSTN as shown in FIG. 1, or can a part of switching equipment included therein.

Figure 6:
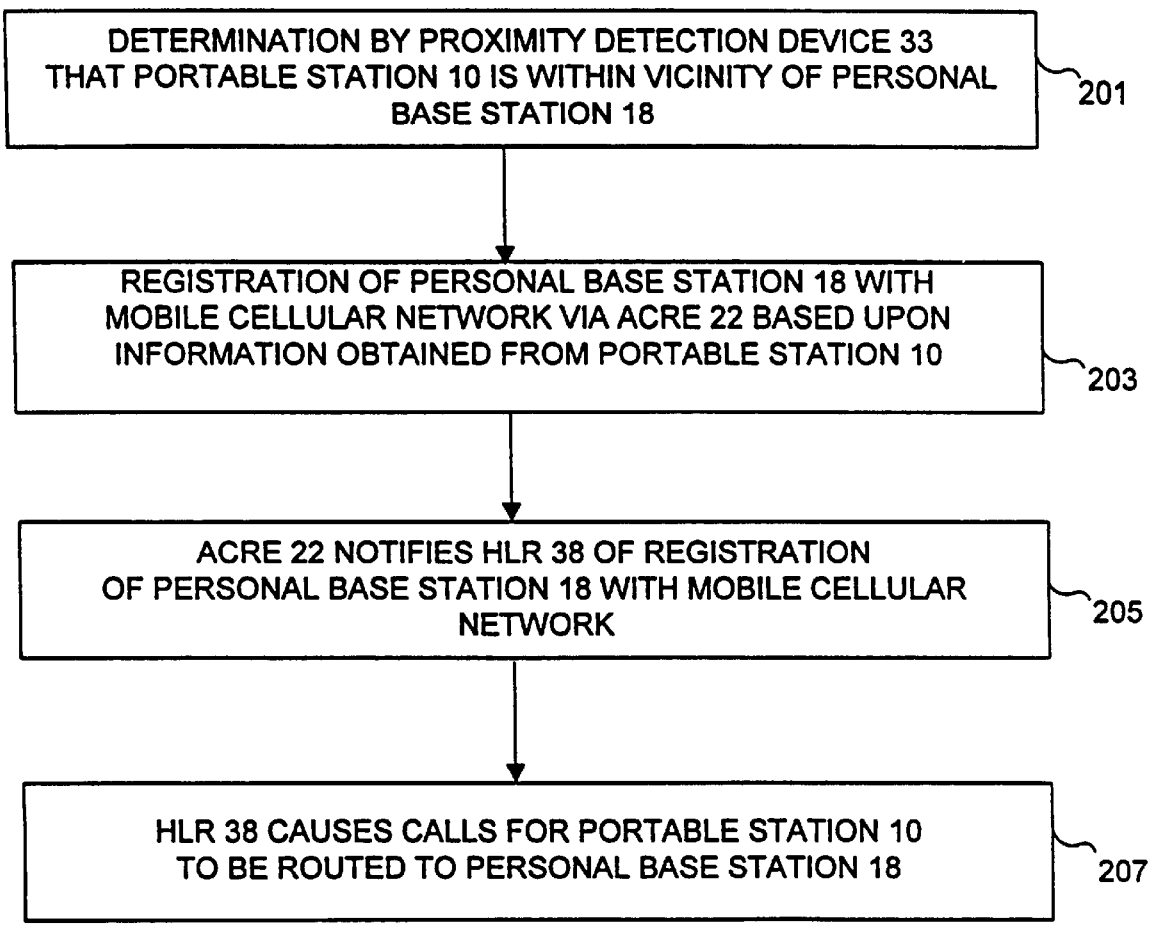
FIG. 6 is a flow chart depicting an exemplary process for registration of a subscriber terminal as being within a predetermined vicinity of the personal base station.

In FIG. 6, an exemplary process for registration of the subscriber terminal 10 as being proximate the personal base station 18 is presented in the form of a flow chart. As discussed above, this registration process occurs in response to the subscriber terminal 10 being within range or docked in the personal base station 18. In an operation 201, the proximity detection device 33 so detects the subscriber terminal 10 as being within range or docked in the personal base station 18.

In an operation 203, the personal base station 18 initiates the registration procedure after the proximity detection of operation 201. In response, the personal base station 18 provides a registration message to the ACRE 22. The registration message includes the MIN of the subscriber terminal 10; a source address of the personal base station 18; a destination address for the HLR assigned to the personal base station 18 and/or an identification number for call forwarding calls intended for the subscriber terminal 10 to the personal base station 18. In operation 205, the ACRE 22 notifies the HLR 38 of the registration of subscriber terminal 10 and the call forwarding number. In operation 207, the HLR 38 recognizes the change in registration and transfers calls intended for the subscriber terminal 10 to the personal base station 18.

Figure 7:
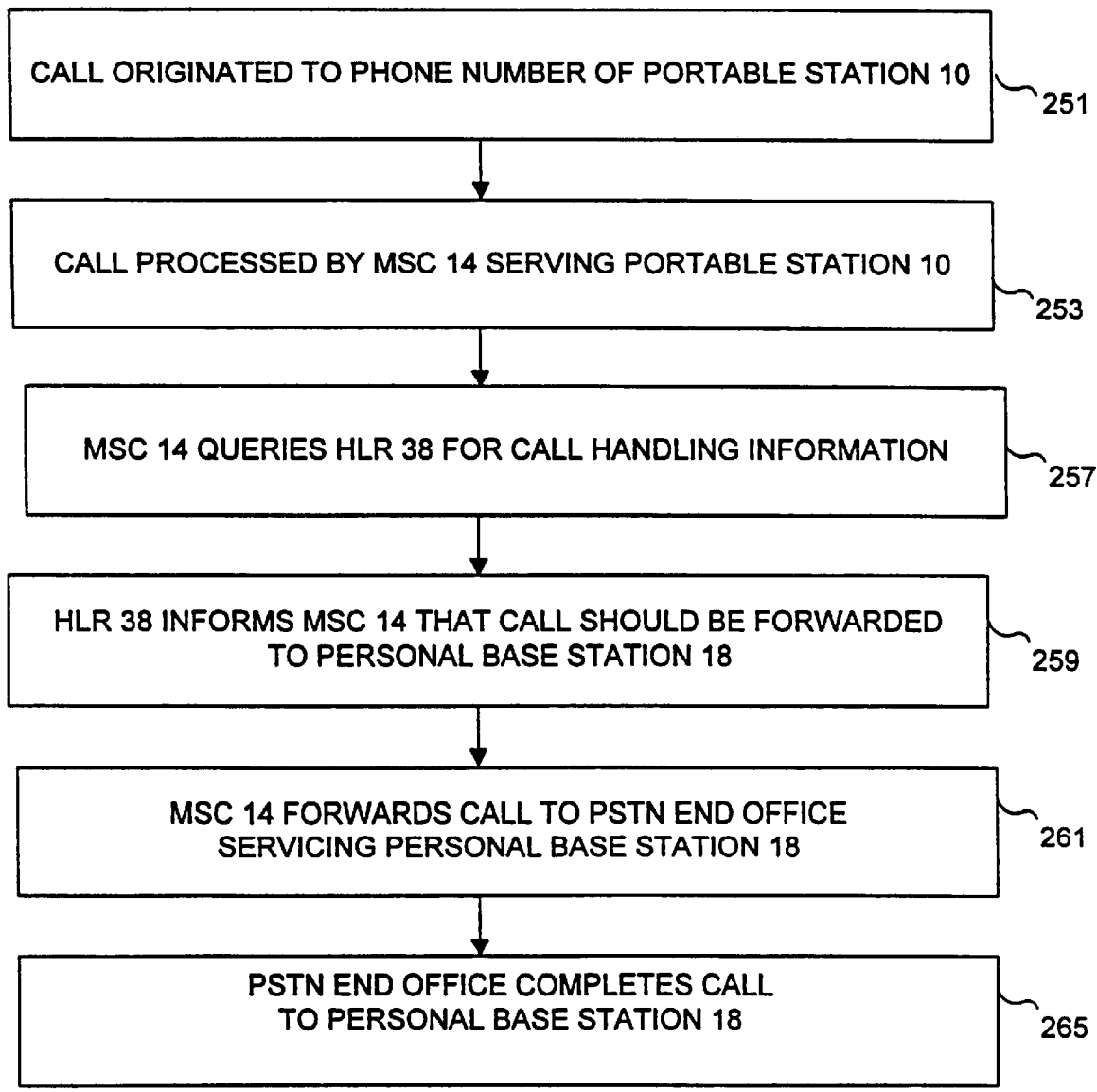
FIG. 7 is a flow chart depicting the call termination process occurring when a subscriber terminal is within a predefined vicinity of the personal base station and a call is placed to the subscriber terminal.

FIG. 7 is a flow chart depicting the call termination process occurring when the subscriber terminal 10 is within range of, or docked within, the personal base station 18 and a call is made from telephone 26 (FIG. 1) to the subscriber terminal 10. In this case, the resulting call is forwarded to the landline telephone number associated with personal base station 18 and not to the subscriber terminal 10. In an operation 251, the call to the subscriber terminal 10 is originated by telephone 26. In an operation 253, the call traverses the PSTN to the MSC 14 (assumed to be the "home" MSC/VLR of subscriber terminal 10) and call processing is initiated. In an operation 257, the MSC 14 queries the HLR 38 (FIG. 1) for call handling information. In this instance, the HLR 38 will have determined that the call is to be forwarded to the personal base station 18.

In an operation 259, the HLR 38 indicates to the MSC 14 that the call is to be forwarded to the personal base station 18 and in an operation 261 the MSC 14 forwards the call to an end office in the PSTN servicing the personal base station 18. In an operation 265, the end office completes the call to the personal base station 18.

Figure 8:
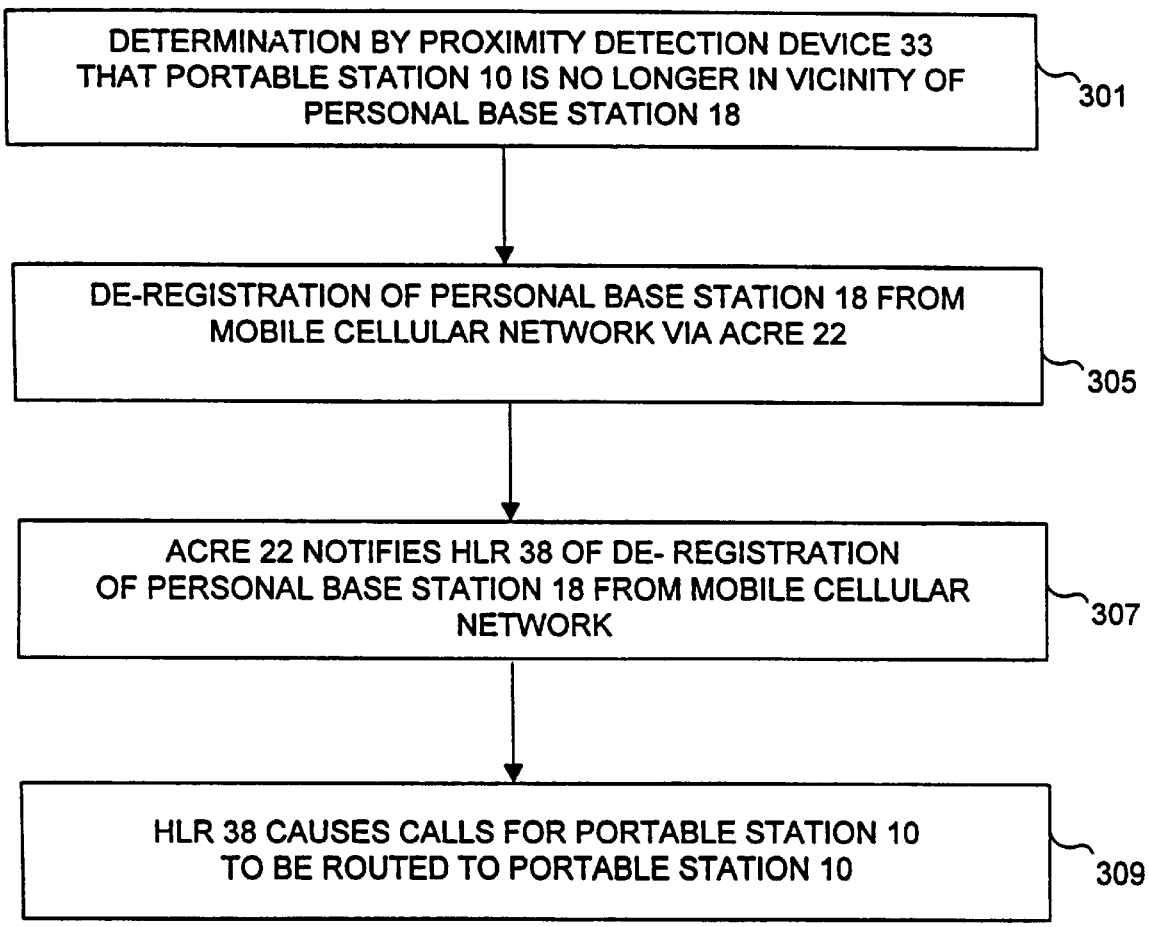
FIG. 8 provides a flow chart illustrating the process by which the personal base station is de-registered from the mobile cellular network following removal of the subscriber terminal from the vicinity of the personal base station.

FIG. 8 provides a flow chart illustrating the process by which the personal base station 18 is de-registered within the mobile cellular network following a selected time interval subsequent to removal of the subscriber terminal 10 from the vicinity of the personal base station 18. In such event the cellular calls intended for the subscriber terminal 10 are in fact directed to the subscriber terminal 10.

In an operation 301, the proximity device 33 determines that the portable base station 10 is no longer within range of, or docked within, the personal base station 18. In an operation 305, the personal base station 18 initiates de-registration from the cellular network. In particular, a message is sent to the ACRE 22 indicating this de-registration condition of the personal base station 18. In an operation 307, the ACRE 22 forwards this de-registration notification to the HLR 38. In response, the HLR 38 routes incoming calls intended for the subscriber terminal 10 directly thereto rather than to the personal base station 18 (operation 309).

The personal base station 18 could optionally be configured to cause calls placed to the personal base station 18 to be forwarded to the subscriber terminal 10. In particular, the personal base station 18 could be programmed such that, upon depression of a dedicated key or button of user interface 42, a predefined feature sequence would be sent to the landline carrier servicing the personal base station 18 via the PSTN. The predefined feature sequence would include a "feature code" (i.e., call forwarding) and the phone number associated with the subscriber terminal 10. As an example, in certain networks the predefined feature sequence "*70 5551212" would instruct the landline carrier to forward calls intended for the personal base station 18 to a telephone number "555-1212" associated with the subscriber terminal 10.

Figure 9:
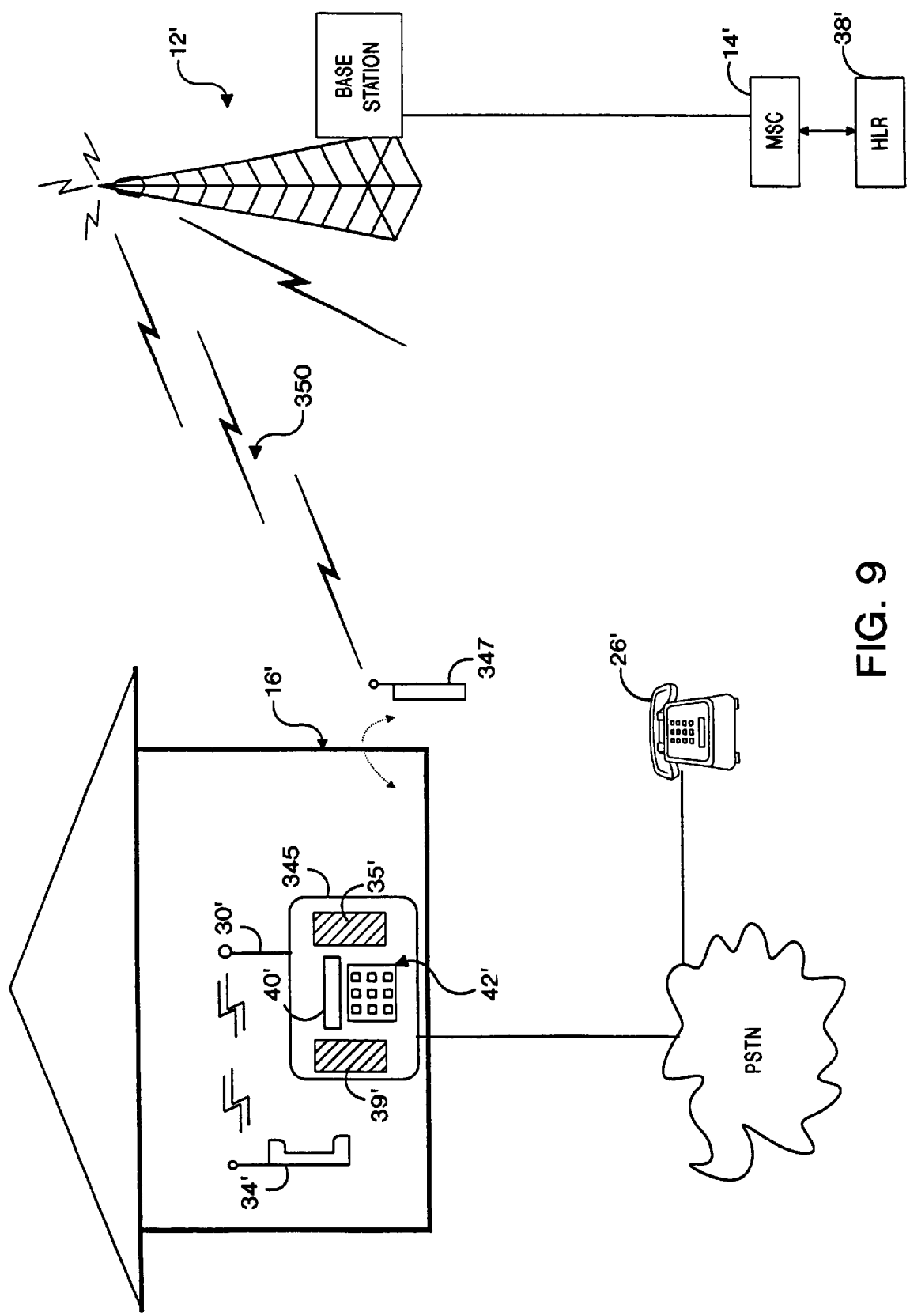
FIG. 9 shows an integrated cellular and cordless communication system incorporating a personal base station of the present invention in which a wireless communication link is utilized to initiate call forwarding in accordance with the present invention.

FIG. 9 shows an integrated cellular and cordless communication system which incorporates a personal base station 345 and in which a subscriber terminal 347 initiates and suspends call forwarding in accordance with the present invention. As is discussed below, call forwarding requests are provided to the external wireless network by the subscriber terminal 347 via a wireless communication link 350 rather than by the personal base station 345 in cooperation with an ACRE.. The personal base station 345 is substantially similar to the personal base station 18, but does not include elements for communicating through a landline connection with an ACRE. In FIG. 9, primed reference numerals will be used to identify elements substantially identical to corresponding elements in FIG. 1.

Referring to FIG. 9, when the subscriber terminal 347 detects that it is being placed in docking bay 35', the subscriber terminal 347 provides a "Deregistration" message to the base station 12'. The Deregistration message will be provided in the format required by the protocol applicable to the wireless communication link 350 (e.g., IS-136, GSM, or IS-95). Upon becoming docked within docking bay 35', the subscriber terminal 347 enters an inactive or "sleep" state and ceases active communication with the base station 12'. The Deregistration message includes the mobile identification number ("MIN") of the subscriber terminal 10', and unconditional call forwarding information instructing the external wireless network to route all cellular calls intended for the subscriber terminal 347 to the landline phone number associated with the personal base station 345.

When calls are subsequently made to the cellular number of the subscriber terminal 347, the external wireless network will route such calls to the telephone number assigned to the personal base station 345. These re-routed calls may be answered upon removal of the cordless station 34' from the docking bay 39' or transferred to a voice messaging module (not shown) within the personal base station 345.

Upon detecting removal from the docking bay 35', the subscriber terminal 347 sends (via wireless communication link 350) a Registration message to the external wireless network which results in de-activation of the call forwarding described above. That is, subsequent calls to the subscriber terminal 347 are in fact directed thereto, rather than to the personal base station 345, by the external wireless network.

As described in the Background of the Invention, one disadvantage of certain proposals for cellular call-forwarding using a personal base station is that a user must possess at least a personal base station, a landline telephone and a cellular telephone. If the user does not desire to, for example, continue to posses a landline telephone upon acquiring a personal base station, then when the user leaves the location which would otherwise be served by the landline telephone (e.g., the user's home) such location is left without telephone service. In addition, the cost of many personal base stations currently being considered for development is increased through use of a wireless communication transceiver to procure information necessary for landline call forwarding from the subscriber's cellular/PCS device.

In summary, an integrated cellular and cordless communication system overcoming the disadvantages described above has been described in which cellular calls are forwarded to landline telephone number associated with a personal base station when a subscriber terminal is determined to be within a predefined vicinity of the personal base station. Once forwarded to the personal base station via ACRE, such calls may be answered using a cordless device operative to communicate with the personal base station. Alternately, the calls may be transferred to a voice messaging module within the personal base station. When the subscriber terminal is determined to have been removed from within the vicinity of the personal base station, a message from the personal base station to the ACRE results in the call forwarding address in the HLR being modified such that subsequent calls intended for the subscriber terminal are in fact routed thereto. The personal base station may also be optionally implemented to enable the forwarding of calls intended for the personal base station to the subscriber terminal 10. Specifically, a subscriber could indicate this intention through, for example, a user interface of the personal base station. In response, the personal base station would inform the ACRE of the desire to initiate call forwarding, and the applicable MSC and HLR would cooperate as described above to appropriately forward subsequent landline calls to the subscriber terminal.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, and clearly many modifications and variations are possible in view of the above teachings. It is intended that the scope of the invention be defined by the following Claims and their equivalents.

We claim:

1. A personal base station capable of communication with an external network, said personal base station comprising:

means for determining when a subscriber terminal is within a predefined vicinity of said personal base station, said means for determining including a first docking bay for said subscriber terminal and a second docking bay for a cordless station;

means for transmitting a registration message to said external network in order that calls from said external network intended for said subscriber terminal are routed to a telephone number associated with said personal base station when said subscriber terminal is within said predefined vicinity; and means for forwarding said calls to a cordless station in communication with said personal base station, said cordless station being physically distinct from said subscriber terminal.

2. A personal base station capable of communication with an external network, said personal base station including a first docking bay for a subscriber terminal and a second docking bay for a cordless station wherein said cordless station is physically distinct from said subscriber terminal, said personal base station comprising:

a transmitter operative to transmit a registration message to said external network in order that calls from said external network intended for said subscriber terminal are routed to a telephone number associated with said personal base station when said subscriber terminal is within a predefined vicinity of said personal base station;

a controller, operatively coupled to said transmitter, capable of forwarding said calls to said cordless station; and a proximity detection device operatively coupled to said controller, said proximity detection device generating a detection signal when said subscriber terminal is within said predefined vicinity of said personal base station.

* * * * *